United States Patent [19]
Nakagawa

[11] 3,849,787
[45] Nov. 19, 1974

[54] LENS SHUTTER WITH PRE-VIEW DEVICE FOR A PHOTOGRAPHIC CAMERA

[75] Inventor: Tadashi Nakagawa, Yotsukaido, Japan

[73] Assignee: Seiko Koki Kabushiki Kaisha, Tokyo, Japan

[22] Filed: Dec. 29, 1972

[21] Appl. No.: 319,154

[52] U.S. Cl. ................. 354/156, 354/232, 354/266
[51] Int. Cl. .......................................... G03b 19/12
[58] Field of Search .......... 95/42, 63; 354/156, 232, 354/266

[56] References Cited
UNITED STATES PATENTS

| | | | |
|---|---|---|---|
| 2,483,025 | 9/1949 | Schwartz | 95/63 |
| 3,122,081 | 2/1964 | Singer | 95/42 X |
| 3,191,514 | 6/1965 | Ohara | 95/42 |
| 3,207,053 | 9/1965 | Singer | 95/63 |
| 3,242,838 | 3/1966 | Singer et al. | 95/42 |
| 3,250,200 | 5/1966 | Singer et al. | 95/42 X |
| 3,283,686 | 11/1966 | Singer et al. | 95/63 |

Primary Examiner—Samuel S. Matthews
Assistant Examiner—E. M. B. O'Connor
Attorney, Agent, or Firm—Robert E. Burns; Emmanuel J. Lobato; Bruce L. Adams

[57] ABSTRACT

A lens shutter with a pre-view device. The shutter has a shutter blade operating member, constructed as an operating ring, for opening and closing the lens aperture. A lock member releasably locks a shutter release member that controls the release of the shutter blade operating member for opening and closing the lens aperture or exposure aperture for taking a photographic exposure. A pre-viewing device has an actuating member for operating the shutter blades operating member to an opening position for pre-viewing of a scene to be photographed. The actuating member cooperates with a release member that releases the lock member for taking of exposures and which releasably holds the actuating member in an operating position in which the lens aperture is open thereby allowing the previewing and then releases the actuating member for closing the lens aperture. This release member effects the control of the pre-viewing device while the lens shutter is in a charged state without possibility of triggering of the lock member it cooperates with for effecting control of photographic exposures.

4 Claims, 8 Drawing Figures

LENS SHUTTER WITH PRE-VIEW DEVICE FOR A PHOTOGRAPHIC CAMERA

BACKGROUND OF THE INVENTION

This invention relates generally to lens shutters for cameras and more particularly to a pre-view device for a lens shutter for a photographic camera.

Cameras provided with lens shutters are known in which a pre-view device is provided for reviewing the scene to be photographed prior to taking of a photographic exposure. In these known devices, the possibility exists of releasing the shutter while it is in a charged or cocked condition. A lock mechanism for the shutter release is provided that must be disenabled after a pre-viewing of the scene before a photographic exposure. This places a burden on the photographer, who must remember to make certain that the shutter release lock is disenabled after the shutter blades have been opened and closed for pre-viewing the photographic scene to be photographed.

SUMMARY OF THE INVENTION

It is an object of the present invention to provide a pre-view device for a lens shutter in which the shutter blades are opened and closed for effecting the pre-view of the photographic scene and the photographer need not carry out any other operation for preparing the camera for taking an exposure.

Another object of the present invention is to provide a pre-view device in which the shutter, once in a charged or cocked state, is in readiness for taking a photographic exposure and the pre-viewing of the scene therethrough does not change these conditions and there is no possibility of prematurely releasing the shutter with the shutter blades in an open condition.

In accordance with the invention, a lens shutter is provided with at least one shutter blade for opening and closing a lens aperture. A shutter blade operating member, constructed as an operating ring, operates the shutter blades to an open position and a closed position for opening and closing the lens aperture. A drive member or cam drives the shutter blade operating member or ring for opening and closing the lens aperture for taking photographic exposures. This drive member is locked by a hook or lock member for releasably locking it and is operable to release the drive member for taking exposures. The pre-view device for opening and closing the lens shutter with the operating member at will when the shutter is in a cocked state comprises an actuating member for actuating the shutter blade operating member for opening and closing the blades to open and close the lens aperture. A release member for releasing the lock member is provided in this device for taking the exposures and also for releasably holding the actuating member in a position in which the actuating member holds the operating member or ring in a condition opening the shutter blades and maintaining them open. This release member can be actuated to release the actuating member for allowing the operating member to close the shutter blades by closing the lens aperture.

Other objects and advantages will appear from the following description of an example of the invention, and the novel features will be particularly pointed out in the appended claims.

DESCRIPTION OF THE PREFERRED EMBODIMENTS

Figure 1:
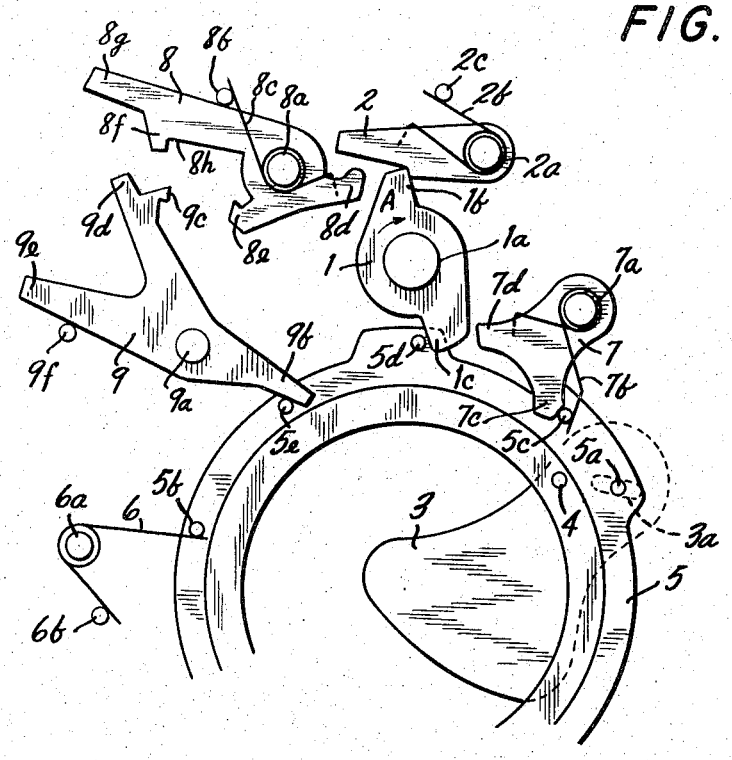
FIG. 1 is a fragmentary diagrammatic elevation view of a lens shutter provided with a pre-view device according to the invention and illustrates the shutter in a cocked condition.

As illustrated in FIG. 1, a drive member or cam 1 is pivotally mounted on a pivot 1a and is biased by a spring, not shown, in a clockwise direction, as illustrated by an arrow A. The drive member 1 is provided with a projection 1b that engages a notch in a lock or hook member 2 mounted on a pivot 2a and biased by a spring 2b in a direction for engaging the drive cam 1 and holding it in a stopped condition. The biasing spring 2b is engaged at one end with the lock lever 2 and a fixed pin 2c as illustrated.

A shutter blade 3 is pivotally mounted on a pin 4 and is operable to a closed and open position by an operating member or ring 5 coaxial with the lens aperture. The blade is provided with an elongated slot 3a into which a blade operating pin 5a is inserted. This pin is mounted on the operating ring. It is noted that only one blade 3 is illustrated in the figure, however, a plurality of blades, not shown, may be similarly provided for co-action with the operating ring 5. The operating ring 5 is rotationally mounted and is biased by a spring 6 about a shaft 6a and held at one end by a pin 6b and bearing against a pin 5b on the operating ring for biasing the operating ring in a clockwise direction.

An acting lever 7 is pivotally mounted on a pivot 7a. A biasing spring 7b is held at one end by the member 7 an biases the lever and a pin 5c on the shutter operating ring 5 into contact along a projection 7c of the acting lever 7. A second projection 7d of this lever is engaged by a projectin or hook 1b of the driving cam 1 as later explained. Another pin 5d on the operating ring 5 is disposed for engagement by the projection 1c of the driving member or cam 1. This pin is engaged by the driving member for rotating the operating ring in a counterclockwise direction for opening the shutter blade or blades when an exposure is taken as later explained.

A release member or lever 8 is pivotally mounted on a pivot 8a and is biased in a clockwise direction by a spring 8c so that it engages a fixed pin 8b. A projection 8d of the release member or lever is engageable with the hook or lock member 2 whenever a photographic exposure is to be taken. A pre-view device according to the invention comprises the release lever 8 and an actuating lever 9 pivotally mounted on a pin 9a and provided with an arm 9b engaging a pin 5e on the shutter blade operating ring. A hook 9c thereon is provided with a tapered end surface which coacts with a tapered surface on a hook 8e of the release lever 8 for releasably hooking the actuating lever to the release lever as later described. A checking or stop part 9d is formed on a second arm of the actuating lever and cooperates with a stop projection 8f on the release lever 8 and engages a surface 8h of the release member lever 8 as hereinafter descried. The actuating member 9 has a third cam 9e that bears against a stop pin 9f. This third arm is for operating the actuating lever 9 and pre-view device as later described.

The shutter illustrated in FIG. 1 is in a cocked condition so that the actuating arm 9 is biased against the stop pin 9f. The lock lever 2 holds the driving cam 1 in a charged state. The shutter mechanism is actuated to the charged state by means, not shown. In order to open the lens aperture, without taking an exposure, and view a scene to be subsequently photographed, the actuating lever 9 is operated by the arm 9e in a clockwise direction against the action of force of the biasing spring 6 and the operating ring 5 is rotated in a counterclockwise direction so that the shutter blade 3 is moved to an open position so that the lens aperture is opened.

Figure 2:
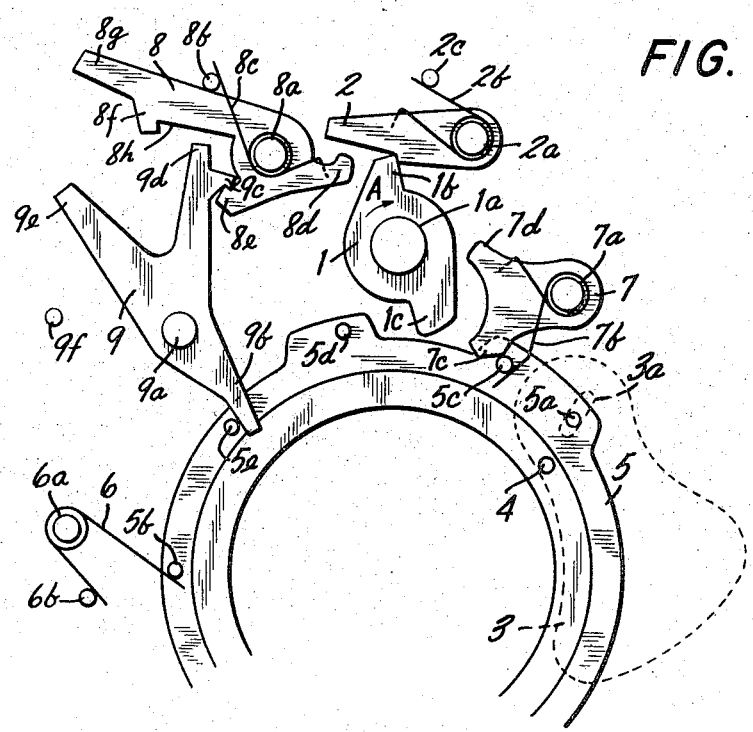
FIG. 2 is a diagrammatic elevation view of the lens shutter and device in FIG. 1 and illustrates it in a condition for pre-viewing a scene to be photographed.
Figure 3:
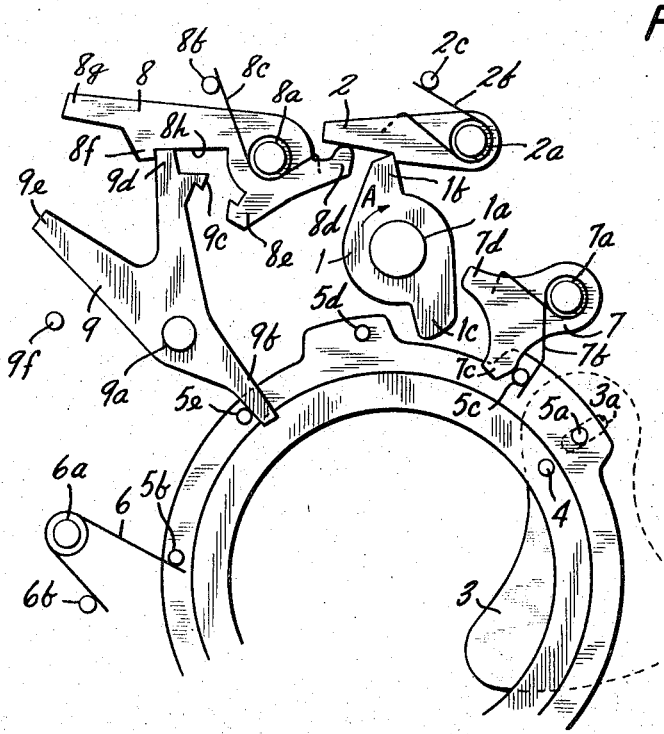
FIGS. 3 and 4 are diagrammatic elevation views of the shutter and device illustrated in FIG. 1 and illustrate the mode of operation thereof for closing the shutter blades subsequent to pre-viewing a scene.
Figure 4:
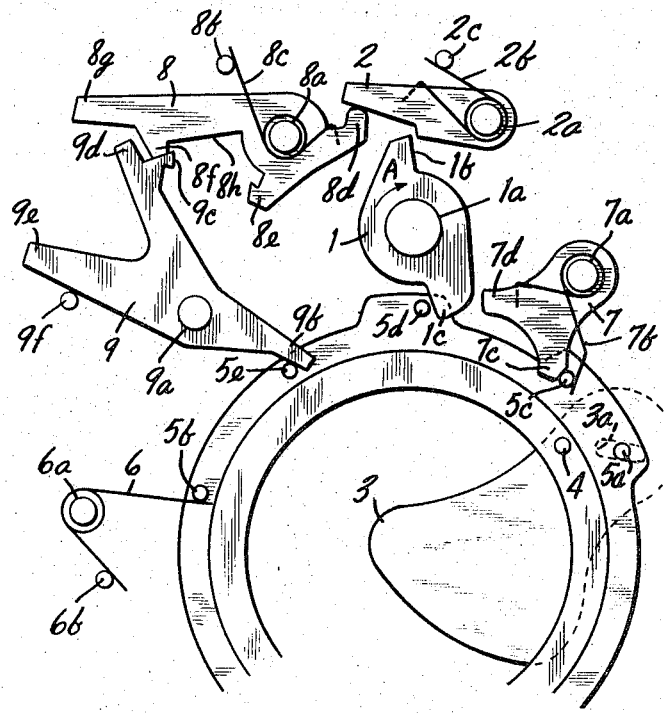

As the operating arm 9e is rotated further clockwise, the hook 9c cams the projection or hook 8e of the release lever and a hooked condition is established, as illustrated in FIG. 2. Thus the actuating member lever 9 is releasably held and the shutter is maintained in an opened state for pre-viewing of the scene to be photographed. In this condition, if the operating arm 8g of the release lever 8 is reversely rotated in a counterclockwise direction, the hook 9c is freed from the release member or lever 8 and since the first arm 9b no longer applies pressure to the operating pin 5e of the shutter blade operating ring 5, the operating ring 5 rotates clockwise in response to the biasing force of the spring 6 and the shutter blade is closed. The shutter lens aperture is accordingly closed.

However, as the actuating member or lever 9 is actuated to release it from the release lever it releases its hook 9c from the release member hook 8e. The second arm portion 9d engages the stop projection 8f of the release lever and the upper edge thereof engages the upper side 8h of the release lever so that the release lever does not rotate in a counterclockwise direction any further than it is rotated by the actuating lever 9 during pre-viewing, and it does not disengage the lock lever 2 so that the drive cam 1 is held immobile. Since the two hooks 8e, 9c have been released, the release lever 8 is biased in a clockwise direction by its biasing spring and the part 9d of the actuating lever or member 9 is freed from the release lever. The actuating lever restores itself to its position illustrated in FIG. 1, in which case the shutter blades are closed and the lens aperture is accordingly closed as before described. The cocked condition of the shutter is maintained and the shutter is in readiness for taking an exposure.

In order to take an exposure, an operating arm 8g of the release member or lever 8 is moved in a counterclockwise direction, so that the projection 8d of the release lever engages and rotates the lock lever 2 clockwise and the driving cam 1 is released and the shutter blade operating ring rotates in a direction for opening the shutter. In this instance, the actuating lever 9 is rotated by the shutter operating ring without its second arm 9d engaging the projection 8 from the stop part 8h of the release lever so that the release lever can actuate the hook or lock member 2.

As the driving cam 1 is released by the lock lever 2, it rotates in a clockwise direction, the opening projection 1c of the driving lever cams the ring actuating pin 5d to open the shutter blade or blades 3 to the open position illustrated in FIG. 2. The drive cam continues its rotation and its projection 1b engages the projection 7d of the acting lever 7 to rotate the acting lever 7 counterclockwise while the arm 7c thereof pushes the actuating pin 5c to rotate the opening and closing ring 5 clockwise for closing the shutter. In this case, the opening projection 1c of the driving member has passed through the locus or path of rotation of the ring actuating pin 5d of the operating ring 5 and it is possible for the shutter blade operating ring to rotate clockwise, therefore the blade 3 closes again, finishing the exposure.

Figure 5:
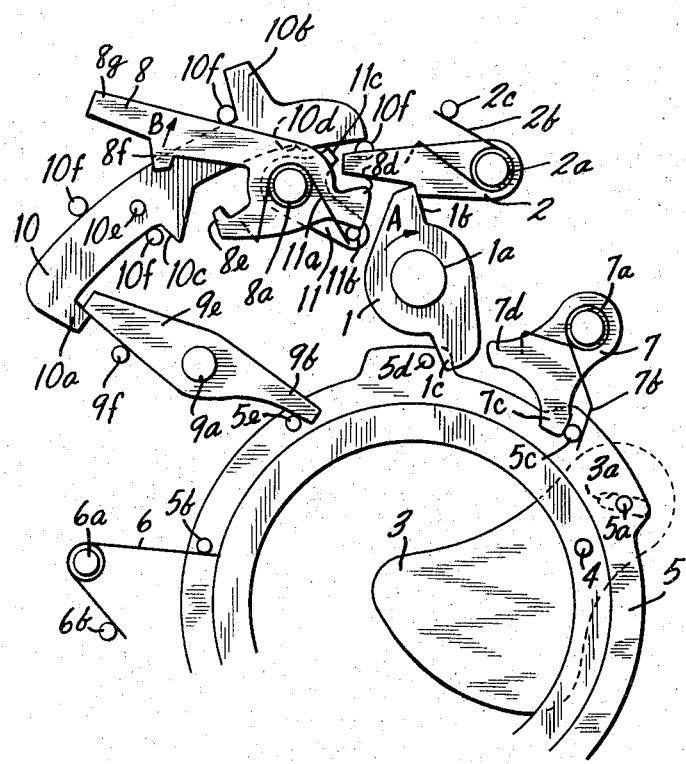
FIG. 5 is a fragmentary elevation view of a lens shutter provided with a second embodiment of a pre-view device according to the invention.
Figure 6:
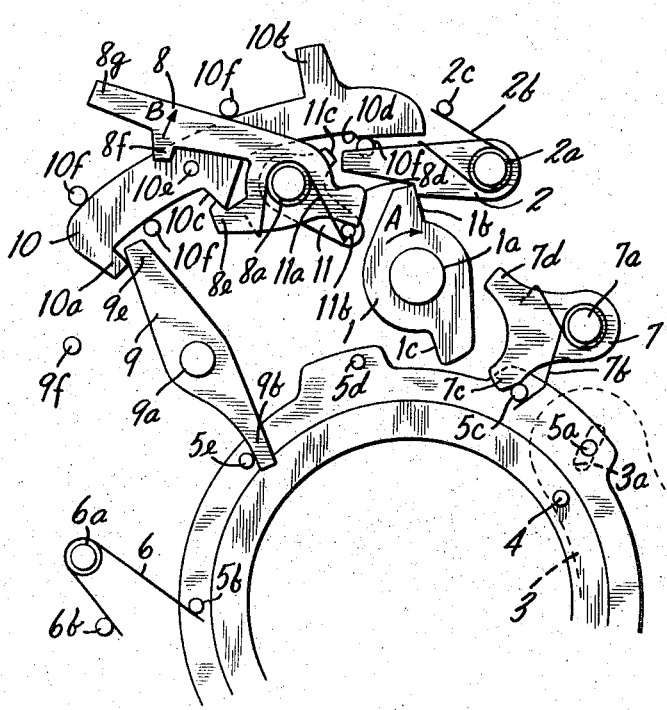
FIG. 6 is a fragmentary diagrammatic elevation view of the shutter and pre-view device of FIG. 5 and illustrated with the shutter blade open.

In FIGS. 5 and 6, a second pre-viewing device for a shutter in accordance with the invention is illustrated. In this second embodiment, the parts corresponding in function to those of the first embodiment, described with respect to FIG. 1, have the same reference numerals as the first embodiment. The corresponding parts perform in substantially the same manner as before described with the exception of the additional mode of operation description which follows.

Thus, in this second embodiment, the actuating lever 9 has less arms and the operating arm 9e thereof coacts with a second actuating lever 10. The second actuating lever is provided with a projection 10a engaged by the first actuating lever 9 so that the second actuating lever is biased in a counterclockwise direction, since the spring 6 biases the operating ring in a clockwise direction, whereby the first actuating lever tends to bias the second actuating lever 10 in the clockwise direction.

The second actuating lever 10 has a projection 10b which is used to actuate both the actuating levers or members 9, 10 jointly. The second actuating lever has a hook projection 10c with a bevelled surface that engages the hook 8d of the release lever 8 as later described. The second actuating member has a curvature and is guided for longitudinal travel by a plurality of fixed pins 10f so that it moves along a path coaxial with the axis of the camera lens and lens aperture, now shown.

In order to carry out a pre-viewing of the scene to be photographed, the second actuating lever 10 is rotated in a clockwise direction, with the operating projection 10b so that its hook projection 10c cams the release lever to bring about engagement of the two hooks 10c, 8e as illustrated in FIG. 6. However, a lock plate 11 is mounted on the same pivot 8a of the release member 8 and is biased by a spring 11a so that a pin 11b thereon bears against the projection 8d of the release lever.

In order to return the shutter blade to a closed condition after pre-viewing a scene to be photographed, the operating arm 8g of the release lever is moved counterclockwise against the action of the biasing spring, which biases it in the direction of the arrow B, so that the second actuating member or lever 10 is released. The arm 11c of the lock plate 11 enters into the locus or path of rotation of the second actuating lever 10 and is ready to engage with a stop surface 10d before the hook 10c is released. When the second actuating lever 10 has its stop surface 10d stopped by engagement with the arm 11c of the stop or lock plate 11, a pin 10e provided on the second actuating lever is disposed in the locus or path of rotation of the projection 8f of the release member or lever 8 to impede rotation of the release lever 8. Thus the release lever projection 8d does not engage with the first hook or release member 2 and accordingly the driving member or cam 1 is not released.

When the operating arm 8g of the release lever 8 is released, the release lever member 8 rotates in a clockwise direction illustrated by the arrow B and its projection 8d pushes the pin 11b of the second lock plate 11 rotating the arm 11c clockwise thereby releasing the stop surface 10b of the second actuating lever 10, so that the second actuating lever 10 rotates counterclockwise under the force of the spring 6 and returns to the condition illustrated in FIG. 5. The charged condition of the shutter is maintained.

In the event that a photographic exposure is to be taken, the operating arm 8g of the release lever 8 is moved counterclockwise rotating the hook 2 to release the driving cam or member 1 so that an exposure is taken in the manner of the first-described embodiment.

Figure 7:
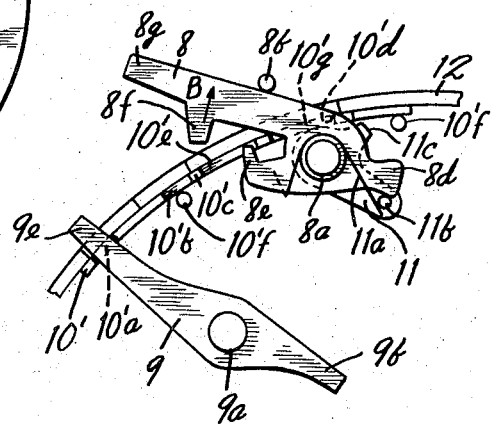
FIG. 7 is a fragmentary elevation view of a part of a pre-view device of the type in FIG. 5 as a third embodiment thereof.
Figure 8:
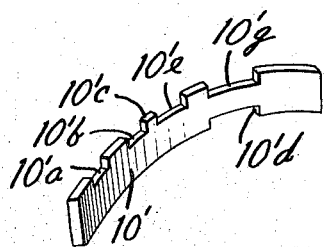
FIG. 8 is a perspective view of a member of the pre-view device illustrated in FIG. 7.

In FIGS. 7 and 8, a third embodiment of a pre-viewing device is shown fragmentarily. In this instance, the parts corresponding to those of the embodiment in FIG. 5 are illustrated as having the same reference numerals. The second actuating lever in this instance is constructed differently and is designated 10', and is guided for travel along an arcuate path by fixed pins 10'f and a shutter casing 12. This second actuating member has four notches 10'a, 10'b, 10'e, 10'g on the upper edge thereof and a fifth notch on a lower edge as illustrated in FIG. 8. The operating arm 9e of the actuating lever 9 extends through an upper edge notch 10a of the second actuating lever 10, so that when this arm is rotated clockwise, for pre-viewing the photographic scene to be photographed, the second actuating lever 10' is also displaced toward the right guided by the shutter case and the fixed pins. The hook 8e of the release lever 8 normally is in the notch 10'e on the upper edge and when the actuating member 10' is moved to the right, it fits into the notch 10'b as illustrated in FIG. 7. Thus a projection 10'c in the second actuating lever 10' is engaged with the hook 8e of the release lever and the actuating lever 10' is held or maintained so that the shutter is held open for pre-viewing as before described.

Upon finishing of the pre-viewing, the release member 8 is rotated counterclockwise against the spring biasing it in the direction of the arrow B. The projection 10'c is accordingly released by the hook 8e on the release lever and the second actuating lever is rotated toward the left but the arm 11c of the lock plate 11 stops the rotation by engagement with the stop surface 10'd in a similar manner to the embodiment in FIG. 5. The second actuating lever 10' maintains its position while the stop projection 10'c checks the rotation of the release lever by engaging the projection 8f of the release lever. Therefore, the projection 8d of the release lever does not engage the lock member 2 so the drive cam remains immobile. Upon release of the pressure on the release lever 8, it returns to the position shown in FIG. 7. Since the actuating lever 10' is also released, the stop projection 10'c assumes the position shown in FIG. 7.

The several embodiments of the invention have been described as applied to a shutter having a shutter blade operating ring having one or more shutter blades. However, the operating member may be other than a ring. It is also possible to turn the actuating lever 9 or the second actuating lever 10' counterclockwise so that the release lever 8 is released thereby to close the shutter blade to establish the states shown in FIGS. 1 and 5.

Thus those skilled in the art will recognize that the invention provides a pre-view device with minimum parts that function simply and positively without use of abnormal force.

What I claim and desire to secure by Letters Patent is:

1. In a lens shutter, at least one shutter blade for opening and closing a lens aperture, a shutter blade operating member for operating said at least one shutter blade to an open position and a closed position opening and closing the lens aperture, a drive member for driving said operating member for opening and closing the lens aperture for taking photographic exposures, a lock member for releasably locking said drive member operable to release said drive member for taking of said exposures, a pre-view device coactive with said operating member for opening and closing the lens shutter with said operating member at will for viewing through said lens aperture the scene to be photographed comprising an actuating member operable from a rest position to a first position and back to said rest position for actuating said shutter blade operating member for respectively opening and closing said at least one blade to open and close the lens aperture independently of said drive member for pre-viewing the scene to be photographed, a release member for releasing said lock member for taking exposures and for releasably holding said actuating member in said first position when actuating said operating member to a position opening said at least one shutter blade and being operable to release said actuating member for allowing said operating member to close the shutter blade thereby closing the lens aperture.

2. In a lens shutter according to claim 1, in which said shutter blade operating member comprises a ring rotational about the axis of the lens aperture.

3. In a lens shutter according to claim 1, in which said actuating member comprises means for releasably locking said release member during actuation of said pre-viewing device to avoid releasing said drive member, thereby avoiding taking of an exposure.

4. In a lens shutter having a shutter blade, a shutter blade operating member for opening and closing the shutter for taking photographic exposures, pre-view means for viewing through a lens aperture the scene to be photographed comprising actuating means coactive with the shutter blade operating member for opening the shutter lens aperture and maintaining it open, at will, and release means coactive with the actuating means for maintaining the lens shutter open for previewing and operable for initiating taking of photographic exposures independently of said actuating means, and means coactive with said release means for initiating taking of photographic exposures independently of said actuating means.

* * * * *